(12) United States Patent
Erickson et al.

(10) Patent No.: US 9,366,695 B2
(45) Date of Patent: Jun. 14, 2016

(54) SCANNING PROBE MICROSCOPE HEAD DESIGN

(71) Applicant: Angstrom Science, Inc., Santa Barbara, CA (US)

(72) Inventors: Andrew Norman Erickson, Santa Barbara, CA (US); Stephen Bradley Ippolito, Saint Petersburg, FL (US); Kyle Alfred Hofstatter, Santa Barbara, CA (US)

(73) Assignee: Angstrom Science, Inc., Santa Barbara, CA (US)

( * ) Notice: Subject to any disclaimer, the term of this patent is extended or adjusted under 35 U.S.C. 154(b) by 0 days.

(21) Appl. No.: 14/805,679

(22) Filed: Jul. 22, 2015

(65) Prior Publication Data

US 2016/0025771 A1    Jan. 28, 2016

Related U.S. Application Data

(60) Provisional application No. 62/027,385, filed on Jul. 22, 2014.

(51) Int. Cl.
*G01Q 20/02* (2010.01)
*G01Q 60/24* (2010.01)
*G01Q 60/38* (2010.01)
*G02B 6/255* (2006.01)
*G02B 6/26* (2006.01)

(52) U.S. Cl.
CPC .............. *G01Q 20/02* (2013.01); *G01Q 60/24* (2013.01); *G01Q 60/38* (2013.01); *G02B 6/2551* (2013.01); *G02B 6/262* (2013.01)

(58) Field of Classification Search
USPC ....................................................... 850/6, 9
See application file for complete search history.

(56) References Cited

U.S. PATENT DOCUMENTS

| | | | | |
|---|---|---|---|---|
| 6,608,684 B1 * | 8/2003 | Gelikonov | .......... | A61B 1/00096 356/479 |
| 6,882,429 B1 * | 4/2005 | Weitekamp | ........ | G01K 11/3213 356/482 |

* cited by examiner

Primary Examiner — Kiet T Nguyen
(74) Attorney, Agent, or Firm — Felix L. Fischer (57) ABSTRACT

A SPM head incorporates a probe and a cantilever on which the probe is mounted. The cantilever has a planar reflecting surface proximate a free end of the cantilever. The cantilever extends from a mechanical mount and a single-mode optical fiber is supported by the mechanical mount to provide a beam axis at an angle away from normal relative to the reflecting surface.

17 Claims, 9 Drawing Sheets

FIG. 1

Prior Art

SCANNING PROBE MICROSCOPE HEAD DESIGN

REFERENCE TO RELATED APPLICATIONS

This application claims priority of U.S. provisional application Ser. No. 62/027,385 filed on Jul. 22, 2014 entitled SCANNING PROBE MICROSCOPE HEAD DESIGN, having a common assignee with the present application, the disclosure of which is incorporated herein.

BACKGROUND INFORMATION

1. Field

Embodiments of the disclosure relate generally to the field of scanning probe microscopy and more particularly a head incorporated in a scanning probe microscope incorporating offset angles introduced between the beam axis and a reflecting surface normal on the cantilever.

2. Background

A Scanning Probe Microscope (SPM) scans a physical probe relative to an object in order to form an image. This may be achieved by movement of either the probe or the object. In an Atomic Force Microscope (AFM) and its many derivatives, the probe is attached to the end of a cantilever, which is also scanned relative to the object. The force exerted on the probe by interaction with the object, deflects the cantilever. Cantilever deflection is then measured by either optical or electrical methods. Electrical methods, such as piezo-electric detection, piezo-resistive detection, capacitive detection, and scanning tunneling microscopy are rarely used in practice due to sensitivity, complexity, and cost limitations. Optical methods measure either the amplitude or phase of light to determine cantilever deflection. Measuring the phase of light requires interference with a reference beam to transform the phase shift into an amplitude shift prior to photo-detection. Optical interferometry methods are also rarely used in practice due to sensitivity, complexity, and cost limitations. Detecting changes in the amplitude of light is the simplest and therefore most commonly used method for measuring cantilever deflection.

In standard cantilever SPM, light from a laser is reflected near the end of the cantilever and its amplitude is measured by a position sensitive detector. The planar reflection surface may be the cantilever itself or a mirror mounted on the cantilever. The cantilever mechanically transforms the magnitude of the force exerted on the probe into angular displacements of the reflecting surface. Reflection then transforms these angular displacements of the reflecting surface into angular displacements of the optical beam that are twice as large. Propagation away from the reflecting surface transforms these angular displacements into spatial displacements of the optical beam, which are then measured by the position sensitive detector.

Most standard cantilever SPM designs have a large head that includes the laser, detector, and a mechanical structure to attach them to the cantilever base. Vibration and drift in this mechanical structure create additional angular and spatial displacements, which limit sensitivity to the small angular displacements associated with probe forces. In object-scanning cantilever SPM, reducing the head size offers several advantages. The primary advantage is improved immunity to vibration and drift. Another advantage is the ability to meet the head size and mass budget associated with certain applications. For example, in SPM applications with an optical microscope, smaller dimensions permits the use of high numerical aperture objectives with short working distance, thereby improving spatial resolution and collection efficiency. In head-scanning cantilever SPM, reducing the head size offers additional advantages beyond those already described. One additional advantage is that the resonance frequencies and associated head scan rates can be significantly increased. Another additional advantage is that the size of the piezo and motor drive elements and their associate power requirements can be reduced.

The optical path in a cantilever SPM can be divided into two or more independent subsystems by guiding light through single-mode optical fiber. Removing the laser and detector from the head and placing them at the tail end of the fiber allows the dimensions of the head to be significantly reduced and eliminates the internal sources of thermal drift. A single-mode optical fiber can function as a bidirectional waveguide to both deliver the laser light and collect it, so only one fiber is necessary. Light propagating in the fundamental mode of standard single-mode fibers has an electromagnetic field distribution, which can be approximated as a Gaussian amplitude function with planar phase fronts. When launched out of a fiber facet, the field distribution may then be approximately described by Gaussian beam equations, where the beam waist is at the fiber facet. The beam radius is the radius from the optical axis where the optical intensity decreases by a factor of the mathematical constant e squared. The minimum value of the beam radius is at the waist, where it is half of the fiber Mode Field Diameter (MFD). The Rayleigh range is the distance from the beam waist position, along the optical axis, where the optical intensity drops to half of its peak value at the waist.

Figure 1:
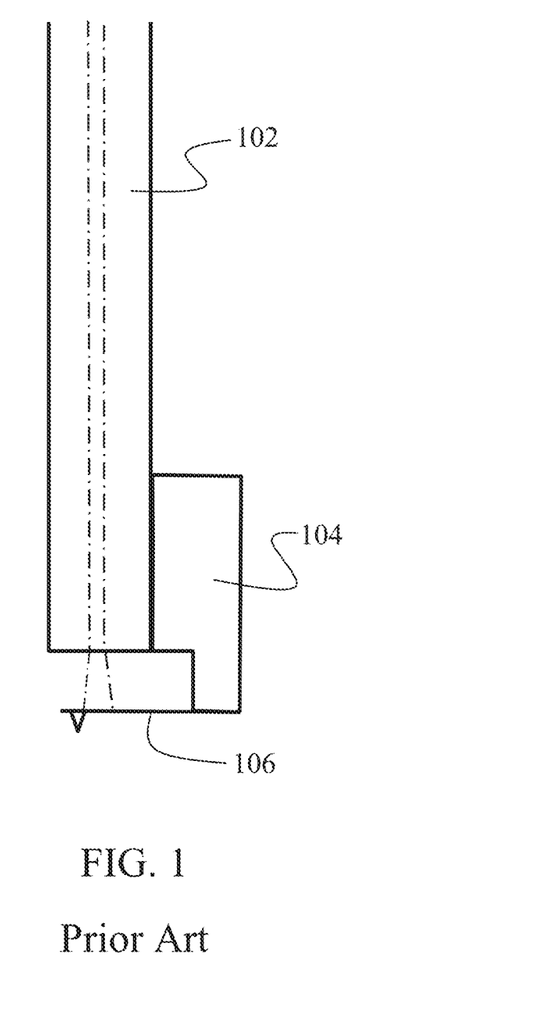
FIG. 1 is a side view representation of a prior art SPM head.

Single-mode optical fiber has been used in certain SPM head designs to reduce the head size down to just a single-mode optical fiber 102, a mechanical mount 104, and a probe cantilever 106 positioned relative to the single-mode optical fiber by the mount 104, as illustrated in FIG. 1. In these designs, changes in the phase of light, associated with longitudinal displacement of a reflecting surface on the probe cantilever are measured by interfering the returning light with reference light. The reflecting surface is designed to be normal to the beam axis, and therefore return as much light from the reflecting surface back into the fiber, as possible. To maintain reasonable efficiency, the reflecting surface diameter must be greater than the fiber MFD, and the distance between the fiber facet and reflection surface should be significantly less than the Rayleigh range associated with the fiber MFD. In such cantilever translation SPM head designs the fiber mode only acts as a waveguide for the incident and reflected light.

It is therefore desirable to provide scanning probe microscope head, which permits greater working distance between the fiber facet and the cantilever reflection surface, and modulates the amplitude of returning light with angular displacement.

SUMMARY

Embodiments described herein disclose a SPM head having a probe and a cantilever on which the probe is mounted. The cantilever has a planar reflecting surface proximate a free end of the cantilever. The cantilever extends from a mechanical mount and a single-mode optical fiber is supported by the mechanical mount to provide a beam axis at an angle away from normal relative to the reflecting surface.

The features, functions, and advantages that have been discussed can be achieved independently in various embodiments of the present invention or may be combined in yet other embodiments further details of which can be seen with reference to the following description and drawings.

DETAILED DESCRIPTION

Figure 2:
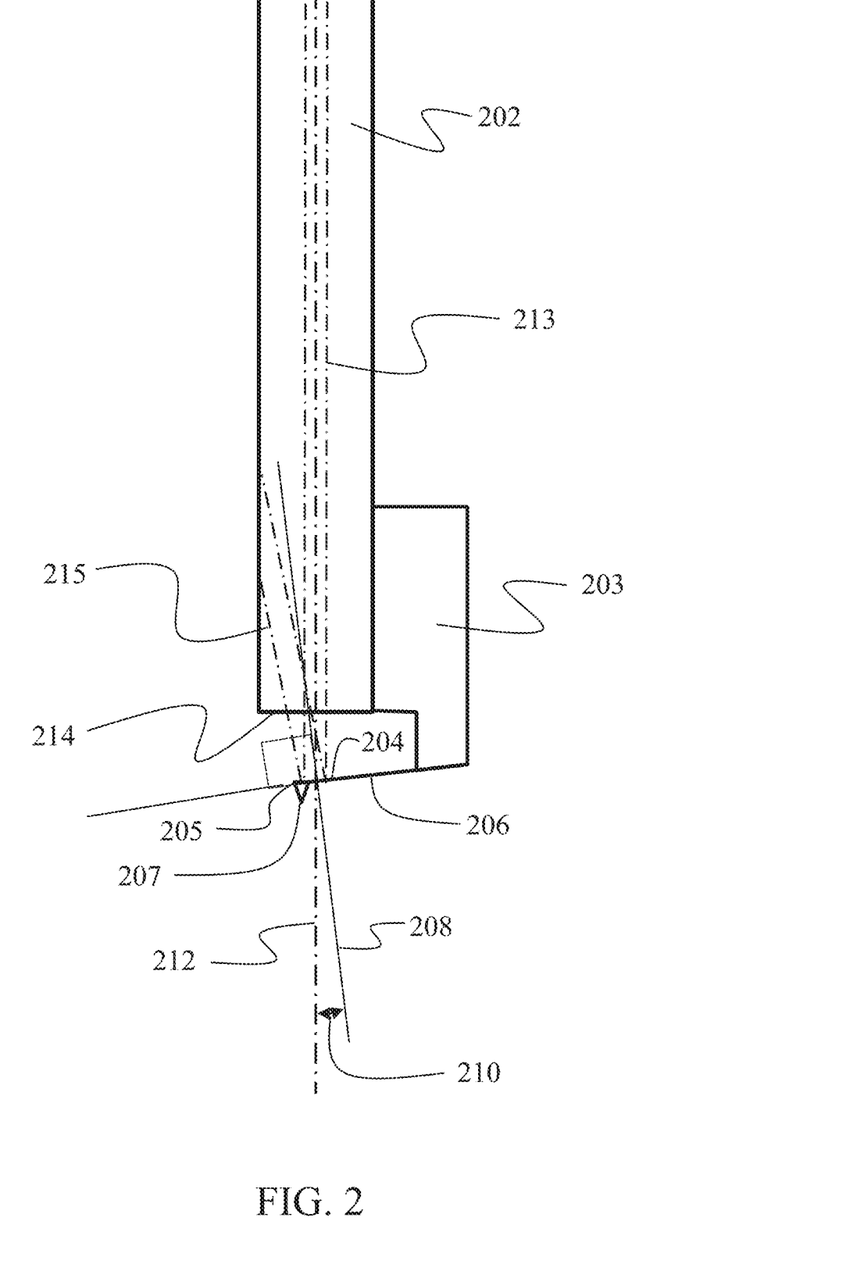
FIG. 2, is a side view representation of a first embodiment of the cantilever rotation SPM head.

For a first embodiment of the scanning probe head described herein a cantilever rotation SPM head is employed as shown in FIG. 2 in which the fiber mode of a single mode fiber 202 also acts as an angular displacement detector, in addition to acting as a waveguide. To accomplish this, an offset angle is introduced between the beam axis and a cantilever reflecting surface normal. In the first embodiment the offset angles is created by a mount 203 mutually supporting the fiber 202 and a reflecting surface 204 of a cantilever 206 supporting a probe 207 near a free end (205) such that a normal 208 to the reflecting surface 204 has an angle 210 with respect to an incident beam axis 212. Thus, the total angle 210 between the beam axis 212 of the incident beam, represented notionally as element 213, and reflecting surface normal 208 are the sum of the initial offset angles and any cantilever displacement angles. A fiber facet 214 is either angled or anti-reflection coated to prevent light reflected by the facet from interfering in the returning fiber mode with light in the reflected beam, represented notionally as element 215, reflected by the reflecting surface of the cantilever. Angling the fiber facet shifts the beam by refraction, and may be also be used as a method of offsetting the beam, in addition to preventing return loss.

The optical power (P) returning from the reflecting surface 204 that is coupled back into the fiber mode is a Gaussian function of the total angle 210, which will hereafter be referred to as θ in mathematical formulae. Calculating the overlap function of the reflected field and the returning fiber mode field yields the following function, where $P_0$ is the power in the incident beam:

$$P_{|\theta|} = P_0 e^{-2\frac{\theta^2}{\theta_0^2}}$$

Figure 3A:
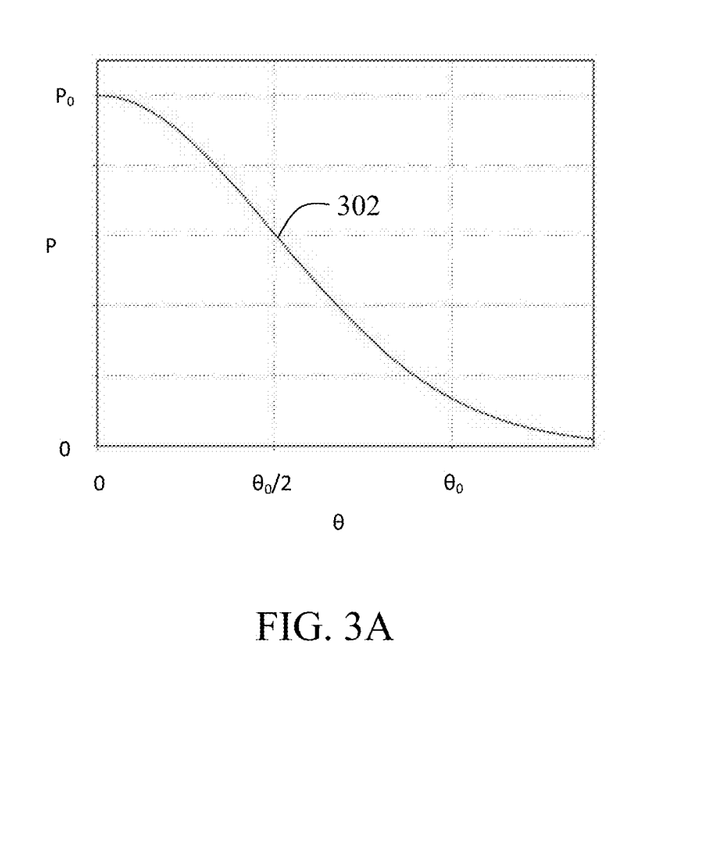
FIG. 3A is a graph of the Gaussian function representing coupling optical power returning from the reflecting surface that is coupled back into the fiber mode.

The optical power (P) is represented by curve 302 in FIG. 3A. The total angle where the power decreases by a factor of the mathematical constant $e^2$ is the divergence angle, which is equal to the wavelength of light divided by the product of the waist radius and the mathematical constant π. The change in power per unit of angular displacement (dP/dθ) is obtained by taking the derivative of the Gaussian function above, which results in a first order Hermite-Gaussian function that peaks at $\theta_0/2$, or half of the divergence angle:

$$\frac{dP_{|\theta|}}{d\theta} = \frac{-4P_0 \theta}{\theta_0^2} e^{-2\frac{\theta^2}{\theta_0^2}}$$

Figure 3B:
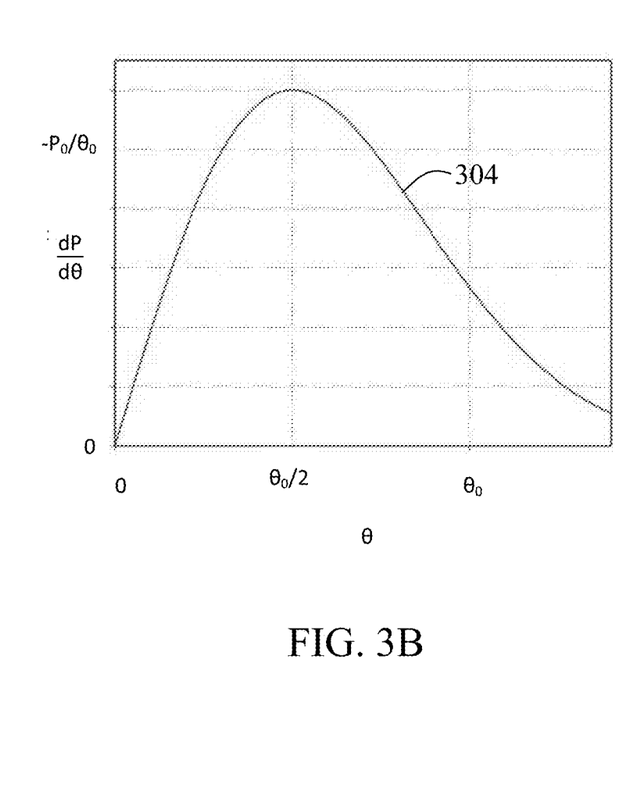
FIG. 3B is a graph of the derivative of the Gaussian function of FIG. 3A showing change in power per unit of displacement angle (dP/dθ), which for small angular displacements represents a small signal magnification value.

The absolute value of the change in power per unit of displacement angle (|dP/dθ|), which for small angular displacements is the small signal magnification value, is represented by curve 304 in FIG. 3B. Increasing the offset angle up to half of the divergence angle therefore decreases the power coupled back into the fiber mode, but increases the sensitivity to small changes in cantilever angle. Increasing the offset angle above half of the divergence angle decreases both the power coupled back into the fiber mode and the sensitivity to small changes in cantilever angle. Operating slightly above or below the divergence angle has little effect on dP/dθ, but significantly alters the background and therefore the signal to noise ratio in some optical detection schemes. Thus, measuring the returning power in the optical fiber mode can replace the functionality of a position sensitive detector simply by introducing an angular offset with an associated loss in power. The efficiency, power, and divergence angle at the reflecting surface all limit the maximized angular sensitivity achievable. For the embodiment shown in FIG. 2 to maintain reasonable efficiency, the reflecting surface diameter must be greater than the fiber MFD, and the distance between the fiber facet and reflection surface should be significantly less than the Rayleigh range associated with the fiber MFD. In order to maximize sensitivity, the divergence angle at the reflecting surface should be reduced by minimizing the optical wavelength, maximizing the reflecting surface diameter, and maximizing the fiber MFD to fill it.

Figure 4:
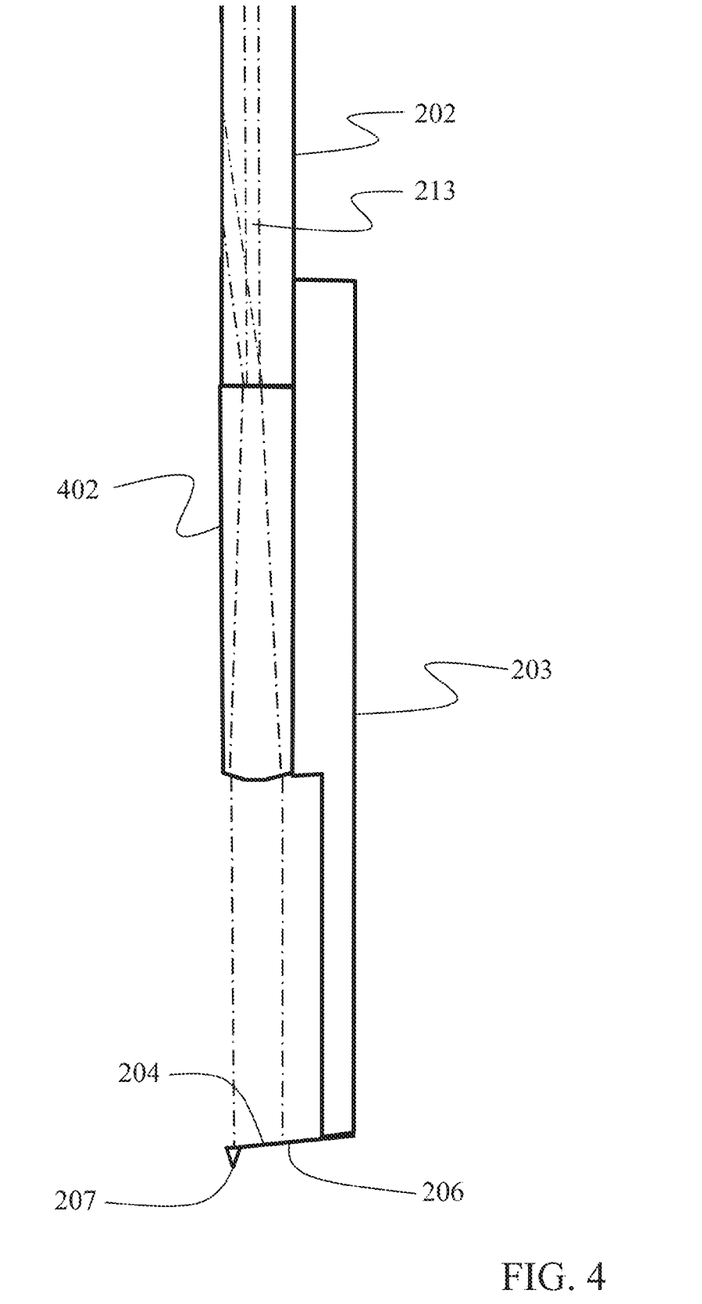
FIG. 4 is a side view representation of a second embodiment of the cantilever rotation SPM head including a coreless fiber lens.

A lens 402 may be employed in certain embodiments as shown in FIG. 4. Adding a lens permits the fiber MFD to be sized independently of the reflecting surfaces diameter, which limits the sensitivity. Large fiber MFD is not always practical from a cost, mass, or bend radius perspective. Additionally, a lens permits placement of the fiber and lens at a distance from the reflecting surface significantly greater than the Rayleigh range associated with the fiber MFD. For applications with multiple SPM and optical microscopes in the same object space, this can also prevent mechanical and optical overlap. In the absence of tight focusing or significant aberrations, the electromagnetic field distribution of the incident beam and returning beam remains Gaussian after reflection by mirrors and refraction by lenses, though the beam parameters change. The lens is designed to fill the reflecting surface area in order to yield high efficiency without sacrificing sensitivity. The lens may be mounted separately, but having the lens directly attached to the fiber simplifies the design of the mechanical mount and permits much smaller head dimensions and mass. Several methods exist for creating a lensed fiber based on fusion splicing technology. One method is fusion splicing a graded index lens, such as a short section of graded index multi-mode fiber, to the end of the single mode fiber. A second method is fusion splicing a ball lens to the end of the single mode fiber. A third method is fusion splicing a small section of coreless fiber to the end of the single mode fiber and forming a spherical surface by melting, polishing, or Focused Ion Beam (FIB) milling. FIG. 4, illustrates such a lensed fiber, which would be convenient for matching the MFD of standard communications fiber with a larger reflecting surface.

Figure 5A:
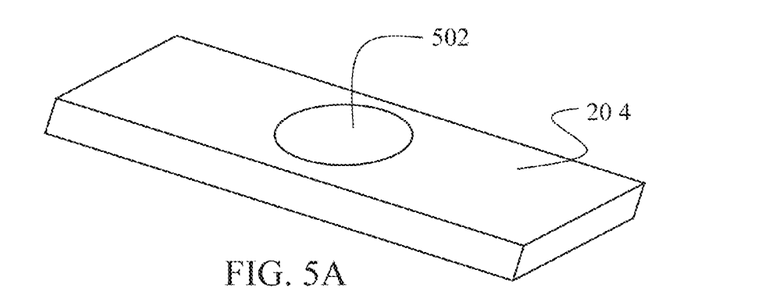
FIG. 5A is a perspective view representation of a first mirror size on the cantilever.
Figure 5B:
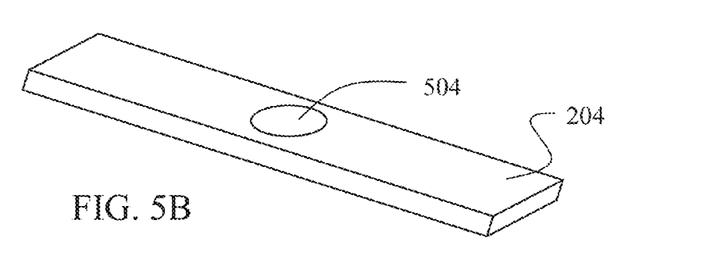
FIG. 5B is a perspective view representation of a second mirror size on a modified cantilever.

The reflecting surface on the cantilever may also be sized to accommodate the spacing of the lensed fiber tip from the cantilever surface. In an exemplary embodiment shown in FIG. 5A, a mirror 502, which may be physically attached to the reflecting surface 204 of the cantilever or create directly on the reflecting surface, is approximately 50 um in diameter. A smaller mirror 504 of approximately 10 um as shown in FIG. 5B matched using manipulation of the lens characteristics and fiber MFD may be employed in alternative embodiments allowing differing cantilever geometry. The cantilever mirror size should be matched to waist radius incident on the mirror to yield high quantum efficiency without sacrificing sensitivity.

Figure 6:
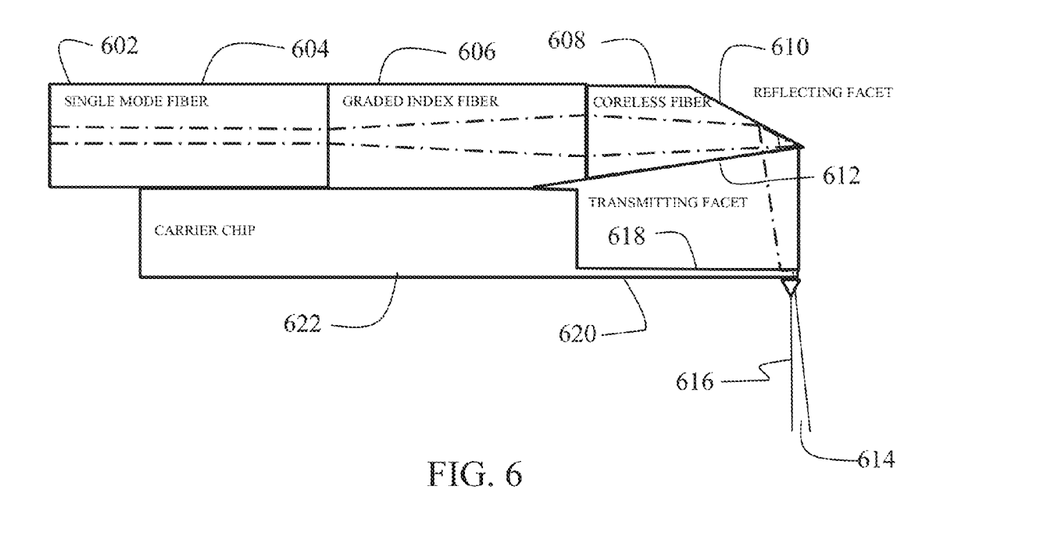
FIG. 6 is a side view representation of a third embodiment of the cantilever rotation SPM head including a graded index fiber lens and a coreless fiber with reflecting and transmitting facets for beam turning.

FIG. 6 illustrates a third embodiment with a configuration where the beam 602 from a single mode fiber 604 is refracted by a graded index multi-mode fiber 606, which serves as the lens. The beam then propagates into a section of coreless fiber 608, where it is reflected at a reflecting facet 610 by either total internal reflection or a metal or dielectric coating, and then refracted through a transmitting facet 612. The angles of facets 610 and 612 are chosen to create the offset angle 614 from the normal 616 of reflecting surface 618 of the cantilever 620. The single mode fiber 604, graded index multi-mode fiber 606 and coreless fiber 608 are mounted relative to the cantilever 620 on a carrier chip 622. The lengths of single mode, graded index, and coreless fibers are chosen to create the appropriate beam size and working distance to match the cantilever reflection surface diameter as previously described. Fabrication of a compound fiber to integrate the single mode fiber 604, graded index multi-mode fiber 606 and coreless fiber 608 is conducted by sequential fusion splicing and cleaving at the appropriate distances. Fabrication of the facets is conducted by mechanical polishing or cleaving thereafter.

Figure 7:
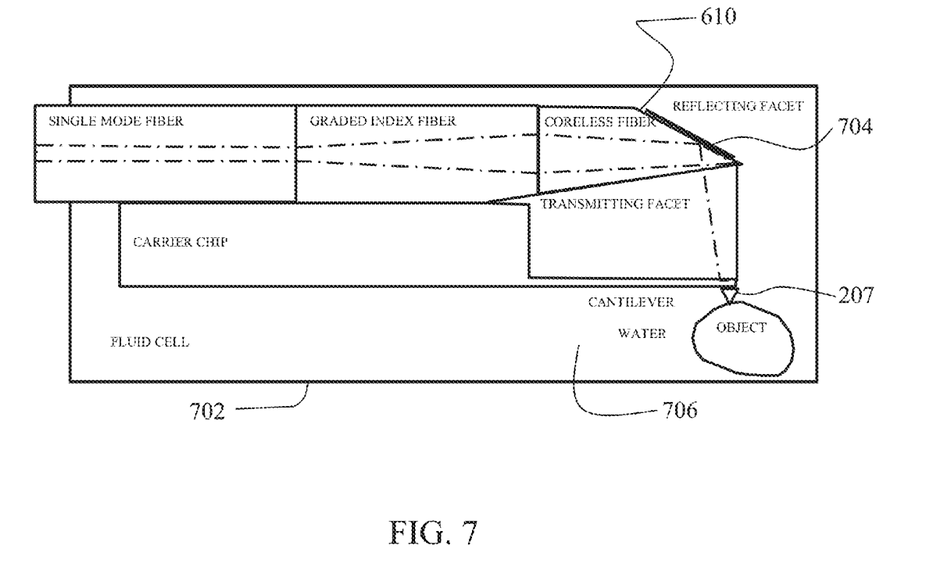
FIG. 7 is a side view representation of a fourth embodiment of the cantilever rotation SPM head immersed in a fluid cell.

FIG. 7 illustrates a similar configuration except that the entire instrument is submerged in water inside of a fluid cell 702, so that an object 700 may be imaged with the probe 207 in-vivo or for purposed of cooling. In this case, a high refection coating 704 is provided on the reflecting facet 610 and the reflection and transmitting facet angles are adjusted to accommodate changes in reflection and refraction due to the non-unity refractive index of the fluid 706.

Figure 8A:
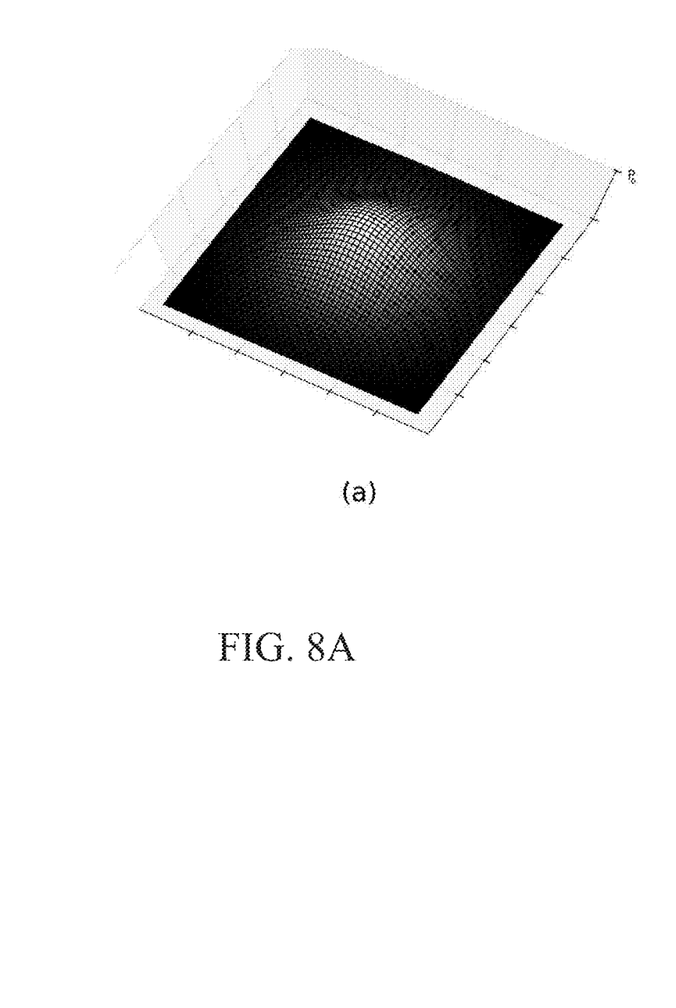
FIG. 8A is a 3 dimensional graph of the Gaussian power function representing that the cantilever mirror surface can tilt in two independent directions represented by spherical coordinate angles (θ,φ), but only has dependency upon the polar angle θ.
Figure 8B:
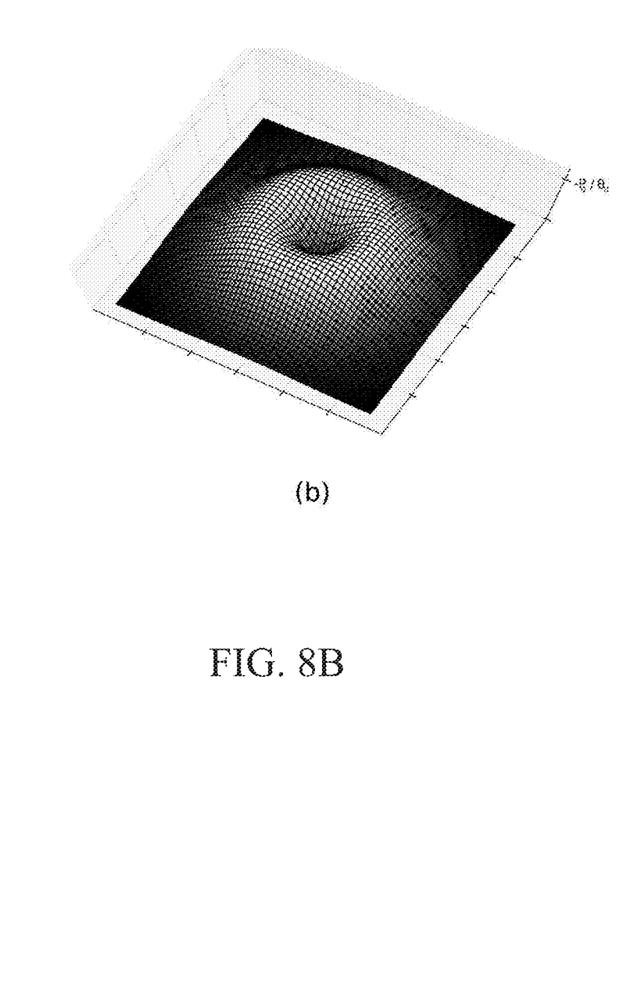
FIG. 8B is a 3 dimensional graph of the derivative of the Gaussian function of FIG. 8A showing change in power per unit of displacement angle (dP/dθ), as a function of spherical coordinate angles (θ,φ)

A reflecting surface on a probe cantilever can tilt in two independent directions, which may be described by spherical coordinates. The power of a reflected beam for embodiments of SPM configurations as described above is strongly dependent on the polar angle ($\theta$) and substantially independent of the azimuthal angle ($\phi$). FIG. 8A shows power and FIG. 8B shows change in power per unit of displacement angle (dP/d$\theta$), as a function of the total angles ($\theta$ and $\phi$). Independently measuring small changes in the angular displacement of the cantilever in both directions is necessary in some applications. The projection of the cantilever displacement angle onto the spherical coordinates involves a rectilinear to circular transform and addition of the angular offsets with respect to beam axis and reflecting surface normal. The offsets determine the small signal magnification value which is then a linear combination of the two cantilever displacement angles. In this manner the cantilever angles cannot be measured independently, and the two values are coupled to determine the resulting polar angle value and therefore power output value. Two separate sets of angular offsets can be achieved by using different wavelengths or polarizations and the dispersive or birefringent nature of the fiber itself or an additional element below the fiber. This would enable independent measuring of the two cantilever displacement angles.

Figure 9A:
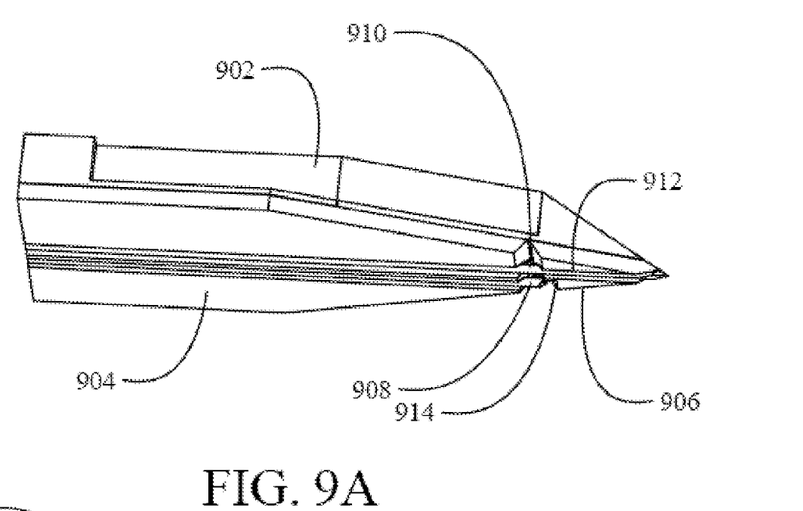
FIG. 9A is an perspective representation of a fifth embodiment incorporating a bending head with a position sense fiber.
Figure 9B:
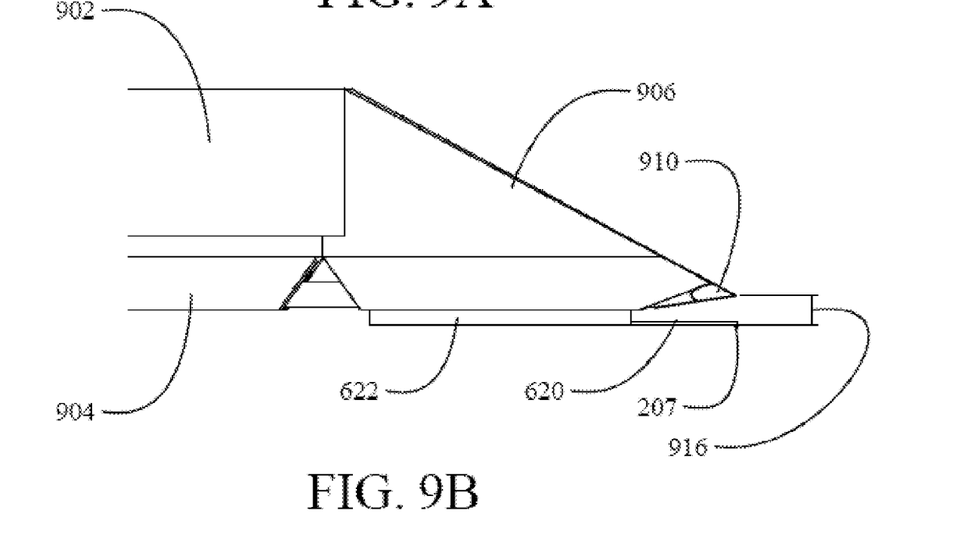
FIG. 9B is a side view of the embodiment of FIG. 9A.

FIGS. 9A and 9B illustrate an exemplary physical embodiment of the SPM head as disclosed herein. A piezoelectric plate bender actuator 902 is attached to a base component 904 and a head component 906. The base component 904 is physically attached to both the plate bender actuator 902 and a position sense fiber 908. The head component 906 mounts an SPM fiber 910 having a configuration substantially as described with respect to FIG. 6 and extending through the based component in a groove 912 and provides a mirror surface 914 to reflect a position sense beam transmitted through the position sense fiber. The position sense beam may be of the interferometric type or the intensity type based on a beam offset, as previously described in the SPM context. A carrier chip 622 supporting a cantilever 620 is mounted to a bottom surface 916 of the head component 906 positioned with respect to the SPM fiber 910 as previously described with respect to FIG. 6. The size of the cantilever mirror typically ranges from 10 um-50 um as previously described. The mode field diameter of the beam is chosen to match the cantilever to maximize the sensitivity and lensing to provide a working distance 916 of at least 100 um permits mounting and removal of the assembly that includes the carrier chip, cantilever, and probe without crashing into the fiber 910. Due to the very short freespace path distance required in the present invention the entire head is approximately 1 mm thick, which permits SPM microscopy and high resolution optical microscopy with high numerical aperture objective lenses with an associated short working distance.

Figure 9C:
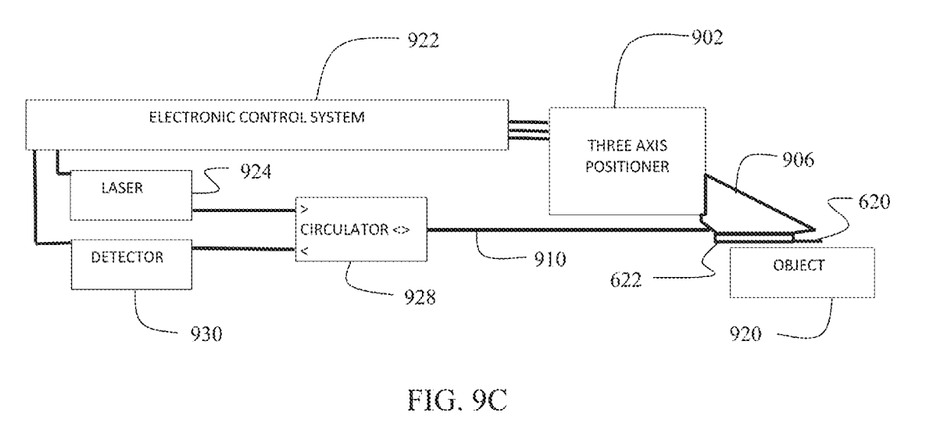
FIG. 9C is a block diagram representation of the microscope system employing the head of FIG. 9A.

As shown in FIG. 9C, the SPM head is incorporated in a head scanning system for imaging of an object 920 wherein the bender 902 provides fast single axis positioning in the z direction and standard piezoelectric positioning in all three axes for the head 906 under the control of an electronic control system 922 to position the carrier chip 622 with the attached cantilever 620 and probe 207. A laser 924 provides a laser beam through an optical circulator 928 to the SPM fiber 910 for reflection from the cantilever reflecting surface as previously described. The reflected beam receive through the SPM fiber is split by the optical circulator and provided to a detector 926 wherein power measurements for the beam may be made and computational routines in the electronic control system may calculate the change in power to determine the displacement angle of the cantilever for control feedback to the positioner.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A structure comprising:
   a probe;
   a cantilever on which the probe is mounted, said cantilever having a planar reflecting surface proximate a free end of the cantilever;
   a mechanical mount from which the cantilever extends and,
   a single-mode optical fiber; said single-mode optical fiber supported by the mechanical mount to provide a beam axis at an angle away from normal relative to the reflecting surface.

2. The structure of claim 1, wherein a lens is disposed between the fiber and reflection surface.

3. The structure of claim 2, wherein said lens is mounted to the fiber as a lensed fiber.

4. The structure of claim 3 wherein the lens is formed by a method selected from fusion splicing a graded index lens to an end of the single mode fiber, fusion splicing a ball lens to the end of the single mode fiber, or fusion splicing a small section of coreless fiber to the end of the single mode fiber and forming a spherical surface by melting, polishing, or Focused Ion Beam (FIB) milling.

5. The structure of claim 2 wherein the single mode optical fiber is oriented by the mechanical mount substantially parallel to the cantilever and further comprising a coreless fiber disposed adjacent the lens opposite the single mode optical fiber, said coreless fiber having a reflecting facet to provide the beam axis at the angle away from normal relative to the reflecting surface of the cantilever.

6. The structure of claim 5 wherein the coreless fiber further has a transmitting facet angled relative to the reflecting facet to accommodate refraction within the coreless fiber to provide the beam axis at the angle away from normal relative to the reflecting surface of the cantilever.

7. The structure of claim 5 wherein the lens is formed by a method selected from fusion splicing a graded index lens to an end of the single mode fiber and the coreless fiber is sequentially fusion spliced and cleaved at the appropriate distances with fabrication of the facets by mechanical polishing or cleaving thereafter.

8. The structure of claim 1 wherein the angle away from normal is substantially one half the divergence angle.

9. The structure of claim 1 wherein the angle away from normal is selected independently for magnification by choosing appropriate offsets angles from normal incidence.

10. The structure of claim 1, wherein said structure is submerged in a fluid cell.

11. A method for detecting small angular displacements of a cantilever, said method comprising:
    offsetting an angle of a reflecting surface on a cantilever relative to an optical axis of a single-mode fiber, said angle magnifying the change in power returning into the fiber mode per unit of change in an angular displacement of the reflecting surface; and,
    measuring change in power to determine angular displacement.

12. A method for fabricating a scanning probe microscope head, said method comprising:
    mounting a probe on a cantilever extending from a mechanical mount;
    mounting a single-mode optical fiber on the mechanical mount to provide a beam axis at an angle away from normal relative to a reflecting surface of the cantilever.

13. The method of claim 12 wherein the step of mounting the single mode fiber further comprises positioning a lens on an end of the single mode optical fiber.

14. The method of claim 13 wherein the step of mounting the single mode fiber further comprises mounting a coreless fiber adjacent the lens opposite the single mode optical fiber.

15. The method of claim 14 further comprising creating a reflecting facet on the coreless fiber, said reflecting facet providing the beam axis at the angle away from normal relative to the reflecting surface of the cantilever.

16. The method of claim 15 further comprising creating a transmitting facet angled relative to the reflecting facet to accommodate refraction within the coreless fiber to provide the beam axis at the angle away from normal relative to the reflecting surface of the cantilever.

17. The method of claim 16 wherein the step of mounting the single mode fiber further includes:
    fusion splicing a graded index lens to an end of the single mode fiber;
    sequentially fusion splicing the coreless fiber to the lens and cleaving at the appropriate distance; and
    fabricating of the reflecting and transmission facets by mechanical polishing or cleaving.

* * * * *